(12) United States Patent
Fukuda (10) Patent No.: US 7,609,333 B2
(45) Date of Patent: Oct. 27, 2009

(54) LIQUID CRYSTAL MODULE WITH U-SHAPED LIGHT SOURCE

(75) Inventor: Yutaka Fukuda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 325 days.

(21) Appl. No.: 11/300,686

(22) Filed: Dec. 14, 2005

(65) Prior Publication Data

US 2006/0145573 A1 Jul. 6, 2006

(30) Foreign Application Priority Data

Dec. 14, 2004 (JP) ............ P. 2004-361030

(51) Int. Cl.
*G02F 1/1333* (2006.01)
(52) U.S. Cl. ............ 349/58; 349/60
(58) Field of Classification Search ............ 349/58–71; 362/632–634
See application file for complete search history.

(56) References Cited

U.S. PATENT DOCUMENTS

| 2002/0149719 | A1 | 10/2002 | Kanatsu et al. | |
| 2004/0179152 | A1* | 9/2004 | Nishikai et al. | 349/61 |
| 2005/0248938 | A1* | 11/2005 | Lin et al. | 362/225 |
| 2005/0259066 | A1* | 11/2005 | Ichikawa et al. | 345/102 |

FOREIGN PATENT DOCUMENTS

| DE | 199 29 792 | 2/2000 |
| JP | 8-76122 | 3/1996 |

OTHER PUBLICATIONS

Patent Abstracts of Japan, Publication No. 08-076122, Publication date Mar. 22, 1996, 2 pages.
German Office Action for patent application No. 10 2005 059 779.3, Issued Jun. 12, 2008, and English translation therefore, 7pages.

* cited by examiner

*Primary Examiner*—David Nelms
*Assistant Examiner*—Jessica M Merlin
(74) *Attorney, Agent, or Firm*—Osha • Liang LLP (57) ABSTRACT

A liquid crystal module includes: a mold frame, the shape of which is rectangular, including a pair of longitudinal plate portions and a pair of lateral plate portions; a liquid crystal cell arranged on the front face of the mold frame; a support frame fixed to a rear face of the mold frame via a reflection sheet; and a U-shaped light source having long lateral pipe portions, which are arranged in parallel with each other, and having a short lateral pipe portion for connecting both the lateral pipe portions, wherein the lamp socket, which is put on the idle end portions of both the lateral pipe portions, is inserted into the small pocket formed in one longitudinal plate portion, and the lamp holder, which is put on the longitudinal pipe portion, is inserted into the large pocket formed in the other longitudinal plate portion.

5 Claims, 11 Drawing Sheets

LIQUID CRYSTAL MODULE WITH U-SHAPED LIGHT SOURCE

BACKGROUND OF THE INVENTION

1. Field of the Invention

The present invention relates to a liquid crystal module, for example, used for a television set or a monitor for personal computer use, characterized in that the number of parts is economically small and the shock resistance property is high.

2. Description of the Related Art

Figure 11:
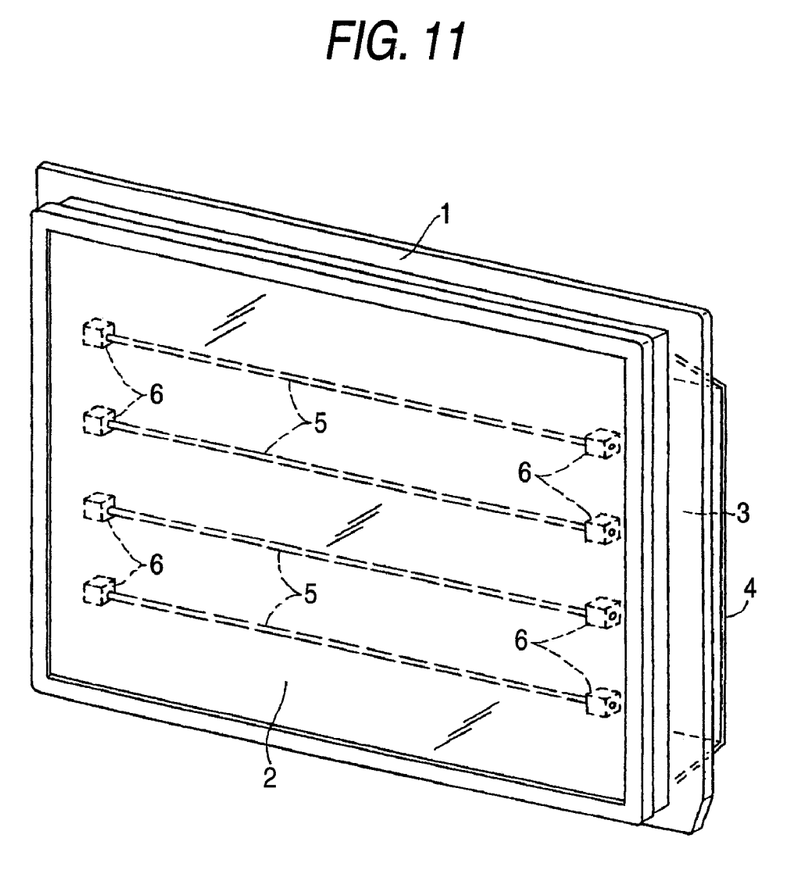
FIG. 11 is a perspective view showing a conventional example.

An example of the conventional liquid crystal module is shown in FIG. 11. This liquid crystal module includes a mold frame 1 made of synthetic resin, the shape of which is formed into a rectangular frame. On the front face of this mold frame 1, the liquid crystal cell 2 is arranged. On the rear face of the mold frame 1, the support frame 4 made of metal is fixed via the reflection sheet 3. The straight-line-shaped light sources 5 including a plurality of cold cathode ray tubes are arranged in the mold frame 1 in parallel with each other at predetermined intervals via the lamp sockets 6 made of elastic material which cover both end portions of the straight-line-shaped light sources 5. The liquid crystal cells 2 are illuminated from the rear by the straight-line-shaped light sources 5.

According to the above structure, the straight-line-shaped light sources 5 uniformly illuminate the liquid crystal cells 2 from the rear side. Therefore, it is necessary to provide a large number of straight-line-shaped light sources 5. Further, the lamp sockets 6, the number of which is twice as large as the number of the straight-line-shaped light sources 5, is needed. Furthermore, one inverter circuit is needed for each straight-line-shaped light source 5. Accordingly, the number of parts is increased and the manufacturing cost is raised.

Therefore, as described in JP-A-8-76122, it is possible to consider that U-shaped light sources are used instead of the straight-line-shaped light sources 5. Due to this structure, it is possible to greatly decrease the number of parts and reduce the manufacturing cost.

SUMMARY OF THE INVENTION

The above U-shaped light source is composed of long lateral pipe portions, which are arranged in parallel with each other, and a short longitudinal pipe portion for connecting both the lateral pipe portions. Idle end portions of both the lateral pipe portions and the longitudinal pipe portion are directly attached to the mold frame 1 by the engagement members. Therefore, for example, when the liquid crystal module is given a shock at the time of transportation, the shock concentrates upon the idle end portions of both the lateral pipe portions and the longitudinal pipe portion. Accordingly, there is a possibility that these portions are damaged.

In view of the above problems of the prior art, the present invention has been accomplished. It is an object of the present invention to provide a liquid crystal module characterized in that the number of parts is economically small and the shock resistance property is excellent.

In order to accomplish the above object, according to a first aspect of the invention, there is provided a liquid crystal module including: a mold frame, the shape of which is rectangular, including a pair of longitudinal plate portions and a pair of lateral plate portions; a liquid crystal cell arranged on the front face of the mold frame; a support frame fixed to a rear face of the mold frame via a reflection sheet; and a plurality of straight-line-shaped light sources arranged between both the longitudinal plate portions at predetermined intervals in parallel with each other via lamp sockets provided at both end portions, so that each straight-line-shaped light source can illuminate the liquid crystal cell from the rear, wherein a plurality of U-shaped light sources are used instead of the straight-line-shaped light sources, each U-shaped light source includes long lateral pipe portions which are parallel with each other and a short longitudinal pipe portion for connecting both lateral pipe portions, an insertion recess portion for inserting both end portions of each lateral pipe portion is formed at a rear end edge of each longitudinal plate portion, a plurality of substantially C-shaped small frame bodies are integrally protruded from an outer circumferential face of one longitudinal plate portion so that the substantially C-shaped small frame bodies can surround the insertion recess portions, a plurality of rectangular substantially C-shaped large frame bodies are integrally protruded on an outer circumferential face of the other longitudinal plate portion so that the substantially C-shaped large frame bodies can surround two adjoining insertion recess portions, a pair of protrusions used for positioning are protruded at a predetermined interval from the center on the inside of each large frame body, two lamp sockets and one lamp holder are used for each U-shaped light source, each lamp socket includes a rectangular block-shaped elastic body, the shape of which is substantially the same as that of a small pocket formed in the small frame body, each lamp socket covers an idle end of each lateral pipe portion via a lamp hole formed in the elastic body, the lamp holder includes a holder body including an elastic body, the lateral width of which is substantially the same as that of the large pocket in the large frame and the longitudinal width of which is substantially the same as that of the interval between the positioning protrusions, the lamp holder also includes an arm portion formed integrally with the holder body, both end portions of the arm portion being extended from the holder body to both sides so that the length can be substantially the same as the interval between both lateral pipe portions, the holder body includes a pair of holding pieces arranged in parallel with each other at an interval a little larger than the outer diameter of the longitudinal pipe portion and also includes an intermediate piece having a lamp hole for connecting the centers of both holding pieces, a slit is formed in the intermediate piece from the end face to the lamp hole, a ventilation hole is formed in the arm portion, the lamp holder, which is put on the longitudinal pipe portion, is inserted into the large pocket when the lamp hole is engaged with the longitudinal pipe portion via the slit and both end portions of the arm portion are contacted with the corner portion between both lateral pipe portions and longitudinal pipe portions, and the U-shaped light source is arranged at a predetermined position in the mold frame when each lamp socket is inserted into each small pocket.

According to a second aspect of the invention, there is provided a liquid crystal module including: a mold frame, the shape of which is rectangular, including a pair of longitudinal plate portions and a pair of lateral plate portions; a liquid crystal cell arranged on the front face of the mold frame; a support frame fixed to a rear face of the mold frame via a reflection sheet; and a plurality of straight-line-shaped light sources arranged between both the longitudinal plate portions at predetermined intervals in parallel with each other via lamp sockets provided at both end portions, so that each straight-line-shaped light source can illuminate the liquid crystal cell from the rear, wherein a plurality of U-shaped light sources are used instead of the straight-line-shaped light sources, each U-shaped light source includes long lateral pipe portions which are parallel with each other and a short longitudinal pipe portion for connecting both lateral pipe portions, an insertion recess portion for inserting both end portions of each lateral pipe portion is formed at a rear end edge of each longitudinal plate portion, a plurality of substantially C-shaped small frame bodies are integrally protruded from an outer circumferential face of one longitudinal plate portion so that the substantially C-shaped small frame bodies can surround the insertion recess portions, a plurality of rectangular substantially C-shaped large frame bodies are integrally protruded on an outer circumferential face of the other longitudinal plate portion so that the substantially C-shaped large frame bodies can surround two adjoining insertion recess portions, two lamp sockets and one lamp holder are used for each U-shaped light source, each lamp socket includes a rectangular block-shaped elastic body, the shape of which is substantially the same as that of a small pocket formed in the small frame body, each lamp socket covers an idle end of each lateral pipe portion via a lamp hole formed in the elastic body, an inner pocket, which is a little smaller than the large pocket, is formed in the inner frame body when a substantially C-shaped inner frame body is integrally formed in each large frame, a pair of positioning pins are protruded at positions opposed to one insertion recess portion in each large frame body at an interval which is the same as the outer diameter of the lateral pipe portion or a little larger than the outer diameter of the lateral pipe portion, the lamp holder includes a rectangular box-shaped elastic body having a bottom piece, the lateral width and the longitudinal width of which are substantially the same as those of the inner pocket, also having a pair of longitudinal pieces formed integrally with the outer circumferential edge of the bottom piece and also having a pair of lateral pieces having a lamp hole, an interval between both the longitudinal pieces is set to be larger than the outer diameter of the longitudinal pipe portion, a slit is formed in each lateral piece from the end face to the lamp hole, the lamp holder, which is put on the longitudinal pipe portion, is inserted into the inner pocket when the lamp hole is engaged with the longitudinal pipe portion via the slit, and the U-shaped light source is arranged at a predetermined position of the mold frame when one lateral pipe portion is inserted into between both positioning pins and each lamp socket is inserted into each small pocket.

According to a third aspect of the invention, there is provided a liquid crystal module including: a mold frame, the shape of which is rectangular, including a pair of longitudinal plate portions and a pair of lateral plate portions; a liquid crystal cell arranged on the front face of the mold frame; a support frame fixed to a rear face of the mold frame via a reflection sheet; and a plurality of straight-line-shaped light sources arranged between both the longitudinal plate portions at predetermined intervals in parallel with each other via lamp sockets provided at both end portions, so that each straight-line-shaped light source can illuminate the liquid crystal cell from the rear, wherein each light source includes a U-shaped light source having long lateral pipe portions, which are arranged in parallel with each other, and also having a short longitudinal pipe portion for connecting both lateral pipe portions, an insertion recess portion for inserting both ends of each lateral pipe is formed at the rear end edge of each lateral plate portion, a plurality of substantially C-shaped small frame bodies are integrally protruded from an outer circumferential face of one longitudinal plate portion so that the substantially C-shaped small frame bodies can surround the insertion recess portions, a plurality of substantially C-shaped large frame bodies are integrally protruded on an outer circumferential face of the other longitudinal plate portion so that the substantially C-shaped large frame bodies can surround two adjoining insertion recess portions, and the U-shaped light source is arranged at a predetermined position of the mold frame when the lamp holder including an elastic body engaged with the longitudinal pipe portion is inserted into the large pocket in the large frame body and when the lamp socket including an elastic body, which covers an idle end of both lateral pipe portions, is inserted into the small pocket in each small frame body.

According to a fourth aspect of the invention according to the third aspect of the invention, wherein the lamp holder includes a holder body, the lateral width of which is substantially the same as that of the large pocket and the longitudinal width of which is substantially the same as the interval between a pair of positioning protrusions integrally protruding from the center on the inside of each large frame body, the lamp holder also includes an arm portion integrally formed in the holder body, both end portions of the arm portion being extended from the holder body to both sides so that the length can be set to be substantially the same as the interval between both lateral pipe portions, the holder body includes a pair of holding pieces which are arranged in parallel with each other at an interval a little larger than the outer diameter of the longitudinal pipe portion, the holder body also includes an intermediate piece having a lamp hole for connecting the centers of both holding pieces, a slit extending from the end face to the lamp hole is formed in the intermediate piece, a ventilation hole is formed in the arm portion, and the lamp holder, which covers the longitudinal pipe portion, is inserted into the large pocket when the lamp hole is engaged with the longitudinal pipe portion via the slit and when both end portions of the arm portion are contacted with the corner portion between both lateral pipe portions and the longitudinal pipe portion.

According to a fourth aspect of the invention according to the third aspect of the invention, wherein when the inside frame body, the shape of which is formed into a substantially C-shape, is integrally formed in each large frame body, the inner pocket a little smaller than the large pocket is formed inside the frame body, a pair of positioning pins are protruded at positions opposed to one insertion recess portion in each large frame body at an interval which is the same as the outer diameter of the lateral pipe portion or a little larger than the outer diameter of the lateral pipe portion, the lamp holder includes a rectangular box-shaped elastic body having a bottom piece, the lateral width and the longitudinal width of which are substantially the same as those of the inner pocket, also having a pair of longitudinal pipes formed integrally with the outer circumferential edge of the bottom piece and also having a pair of lateral pieces having a lamp hole, an interval between both the longitudinal pieces is set to be larger than the outer diameter of the longitudinal pipe portion, a slit is formed in each lateral piece from the end face to the lamp hole, the lamp holder, which is put on the longitudinal pipe portion, is inserted into the inner pocket when the lamp hole is engaged with the longitudinal pipe portion via the slit, so that one lateral pipe portion can be inserted into between both positioning pins.

According to the first aspect of the invention, the U-shaped light source is used for illuminating the crystal cells from the rear side. Accordingly, compared with the conventional structure in which the straight-pipe-shaped light sources are used, the number of the light sources can be reduced to half. Further, the number of parts such as lamp sockets and inverter circuits can be reduced to half. Accordingly, the manufacturing cost can be greatly reduced.

Since the lamp holder has a holder body and an arm portion and the slit is formed in the intermediate piece having a lamp hole located between both holding pieces of the holder body, only when the lamp hole is engaged with the longitudinal pipe portion via the slit, the lamp holder can easily cover the longitudinal pipe portion.

An impact force given in the lateral direction along the longitudinal direction of the lateral pipe portion is received by the longitudinal plate portion of the mold frame, the small frame body and the large frame body via the lamp socket and the lamp holder. An impact force given in the longitudinal direction along the longitudinal direction of the longitudinal pipe portion is received by both the positioning protruding pieces and the small frame body via the lamp socket and the lamp holder. An impact force given in the before and after direction perpendicular to the lateral and the longitudinal direction is received by the mold frame and the support frame via the lamp socket and the lamp holder. For example, even when an impact force is given to the U-shaped light source in all directions at the time of transportation, the impact force can be positively reduced by the buffer actions of the lamp socket and the lamp holder. Therefore, the impact force does not concentrate upon the idle end portions of both the lateral pipe portions and the longitudinal pipe portion. In this way, the U-shaped light source can be prevented from being damaged by the impact force. Accordingly, it is possible to provide a liquid crystal module, the shock resistance property of which is excellent.

Further, the ventilation hole is provided in the arm portion of the lamp holder and both the holding pieces of the holder body are separate from the longitudinal pipe portion. Therefore, the ventilation property is so excellent that heat can not stay in the lamp holder. Further, only the intermediate piece of the holder body comes into contact with the longitudinal pipe portion a little via the inner circumferential face of the lamp hole. Accordingly, there is no possibility that the temperature is raised and the luminance is lowered by the heat generated by the longitudinal pipe portion and the life of the U-shaped light source can be extended.

According to the second aspect of the invention, the substantially same effect as that of the first aspect of the invention can be provided. The lamp holder includes a rectangular box-shaped elastic body having a bottom piece, the lateral width and the longitudinal width of which are the substantially same as those of the inner pocket in each large frame body, and having a pair of longitudinal pieces, which are integrally formed at the outer circumferential edge of the bottom piece, and having a pair of lateral pieces having a lamp hole. In each lateral piece, the slit extending from the end face to the lamp hole is formed. Therefore, only when the lamp hole is engaged with the longitudinal pipe portion via the slit, the lamp holder can be easily put on the longitudinal pipe portion.

An impact force given in the lateral direction along the longitudinal direction of the lateral pipe portion is received by the small frame body, the inside frame body and the mold frame via the lamp socket and the lamp holder. An impact force given in the longitudinal direction along the longitudinal direction of the longitudinal pipe portion is received by the lamp socket, both the lateral pieces of the lamp holder and both the positioning pins for holding the lateral pipe portion. An impact force given the before and after direction perpendicular to the lateral direction and the longitudinal direction is received by the mold frame and the support frame via the lamp socket and the lamp holder. For example, even when an impact force is given to the U-shaped light source in all directions at the time of transportation, the impact force can be positively reduced by the buffer actions of the lamp socket and the lamp holder. Therefore, the impact force does not concentrate upon the idle end portions of both the lateral pipe portions and the longitudinal pipe portion. In this way, the U-shaped light source can be prevented from being damaged by the impact force. Accordingly, it is possible to provide a liquid crystal module, the shock resistance property of which is excellent.

Further, since both the longitudinal pieces of the lamp holder are separate from the longitudinal pipe portion, the ventilation property is excellent and no heat stays in the lamp holder. Further, the lamp holder comes into contact with the longitudinal pipe portion a little via the lamp holes of both the lateral pieces. Accordingly, there is no possibility that the temperature is raised and the luminance is lowered by the heat generated by the longitudinal pipe portion and the life of the U-shaped light source can be extended.

According to the third aspect of the invention, the U-shaped light source is used for illuminating the crystal cells from the rear side. Accordingly, compared with the conventional structure in which the straight-pipe-shaped light sources are used, the number of the light sources can be reduced to half. Further, the number of parts such as lamp sockets and inverter circuits can be reduced to half. Accordingly, the manufacturing cost can be greatly reduced.

Only when the lamp holder engaged with the longitudinal pipe portion of the U-shaped light source is inserted into the large pocket and only when the lamp socket, which is put on the idle end portions of both the lateral pipe portions of the U-shaped light source, is inserted into the small pocket, the U-shaped light source can be arranged at a predetermined position of the mold frame. For example, even when an impact is given to the liquid crystal module at the time of transportation, the impact force can be reduced by the buffer actions of the lamp socket and the lamp holder. Therefore, the impact force does not concentrate upon the idle end portions of both the lateral pipe portions and the longitudinal pipe portion. Accordingly, it is possible to provide a liquid crystal module, the shock resistance property of which is excellent.

According to the fourth aspect of the invention, the lamp holder includes a holder body and an arm portion, and the slit is formed in the intermediate piece having a lamp hole provided between both the holding pieces having a lamp hole of the holder body. Therefore, only when the lamp hole is engaged with the longitudinal pipe portion via the slit, the lamp holder can be easily put on the longitudinal pipe portion.

An impact force given in the lateral direction along the longitudinal direction of the lateral pipe portion is received by the longitudinal plate portion of the mold frame and the large frame portion via the lamp holder. An impact force given in the lateral direction along the longitudinal direction of the longitudinal pipe portion is received by both the positioning protruding pieces via the lamp holder. An impact force in the before and after direction perpendicular to the lateral and the longitudinal direction is received by the mold frame and the support frame via the lamp holder. Therefore, even when an impact force is given to the U-shaped light source in all directions, the impact force can be positively reduced by the buffer action of the lamp holder. In this way, the U-shaped light source can be prevented from being damaged by the impact force.

Further, the ventilation hole is provided in the arm portion and both the holding pieces of the holder body are separate from the longitudinal pipe portion. Therefore, the ventilation property is so excellent that heat can not stay in the lamp holder. Further, only the intermediate piece of the holder body comes into contact with the longitudinal pipe portion a little via the inner circumferential face of the lamp hole. Accordingly, there is no possibility that the temperature is raised and the luminance is lowered by the heat generated by the longitudinal pipe portion and the life of the U-shaped light source can be extended.

According to the fifth aspect of the invention, the lamp holder includes a rectangular box-shaped elastic body having a bottom piece, the lateral width and the longitudinal width of which are substantially the same as those of the inner pocket, also having a pair of longitudinal pipes formed integrally with the outer circumferential edge of the bottom piece and also having a pair of lateral pieces having a lamp hole, and a slit is formed in each lateral piece from the end face to the lamp hole. Therefore, only when the lamp hole is engaged with the longitudinal pipe portion via the slit, the lamp holder can be easily put on the longitudinal pipe portion.

An impact force given in the lateral direction along the longitudinal direction of the lateral pipe portion is received by the inside frame body, which forms an inner pocket, and the mold frame via the lamp holder. An impact force given in the longitudinal direction along the longitudinal direction of the longitudinal pipe portion is received by both the lateral pieces of the lamp holder and both the positioning pins for holding the lateral pipe portion. An impact force given in the before and after direction perpendicular to the lateral and the longitudinal direction is received by the mold frame and the support frame via the lamp holder. Therefore, even when an impact force is given to the U-shaped light source in all directions, the impact force can be positively reduced by the buffer action of the lamp holder. In this way, the U-shaped light source can be prevented from being damaged by the impact force.

Further, both the longitudinal pieces are separate from the longitudinal pipe portion. Therefore, the ventilation property is so excellent that heat can not stay in the lamp holder. Further, only the holder body comes into contact with the longitudinal pipe portion a little via the lamp holes formed in both the lateral pieces. Accordingly, there is no possibility that the temperature is raised and the luminance is lowered by the heat generated by the longitudinal pipe portion and the life of the U-shaped light source can be extended.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

FIGS. 1 to 7E are views showing a primary portion of the liquid crystal module of the first embodiment of the present invention. Instead of a plurality of straight-pipe-shaped light sources 5 (shown in FIG. 11) which are conventionally used, a plurality of U-shaped light sources 8 (two U-shaped light sources 8 in this embodiment) are used. Each U-shaped light source 8 includes: long lateral pipe portions 8a arranged in parallel with each other; and a short longitudinal portion 8b for connecting both lateral pipe portions 8a. The mold frame 1 is formed into a rectangular frame shape by a pair of right and left longitudinal plate portions 1a, 1c, which are inclined to the front, and a pair of upper and lower lateral plate portions 1b, 1d which are also inclined to the front. At the rear end edge of each longitudinal plate portion 1a, 1c, the insertion recess portion 9, into which both end portions of each lateral pipe portion 8a are inserted, is formed. A plurality of small frame bodies 10, the shape of which is a substantial C-shape, are integrally protruded from the outer circumferential face of one longitudinal plate portion 1a in such a manner that each small frame body surrounds the insertion recess portion 9. A plurality of large frame bodies 11, the shape of which is rectangular substantially C-shaped, are integrally protruded on the outer circumferential face of the other longitudinal plate portion 1c in such a manner that each large frame body surrounds the two adjoining insertion recess portions 9. At the center on the inside of each large frame body 11, a pair of positioning protruding pieces 12 are integrally protruded at a predetermined interval. Two lamp sockets 6 and one lamp holder 13 are provided for each U-shaped light source 8. In this connection, in FIGS. 2 and 3, reference numeral 14 is a diffusion sheet, reference numeral 15 is a diffusion plate, reference numeral 16 is a bezel, and reference numeral 17 is a lamp cable. In the structure except for the structure described above, like reference characters are used to indicate like parts in FIGS. 1 to 7E and FIG. 11, and the same explanations are omitted here.

According to the above structure, the U-shaped light source 8 is used for illuminating the liquid crystal cells 2 from the rear side. Accordingly, compared with the conventional structure in which the straight-pipe-shaped light sources 5 (shown in FIG. 11) are used, the number of the light sources 8 can be reduced to half. Further, the number of parts such as lamp sockets 6 and inverter circuits can be reduced to half. Accordingly, the manufacturing cost can be greatly reduced. Further, since the longitudinal pipe portion 8b of each U-shaped light source 8 is located outside the mold frame 1, the liquid crystal cells 2 can be uniformly illuminated by the lateral pipe portion 8a in the same manner as that of the conventional straight-pipe-shaped light source 5.

Figure 1:
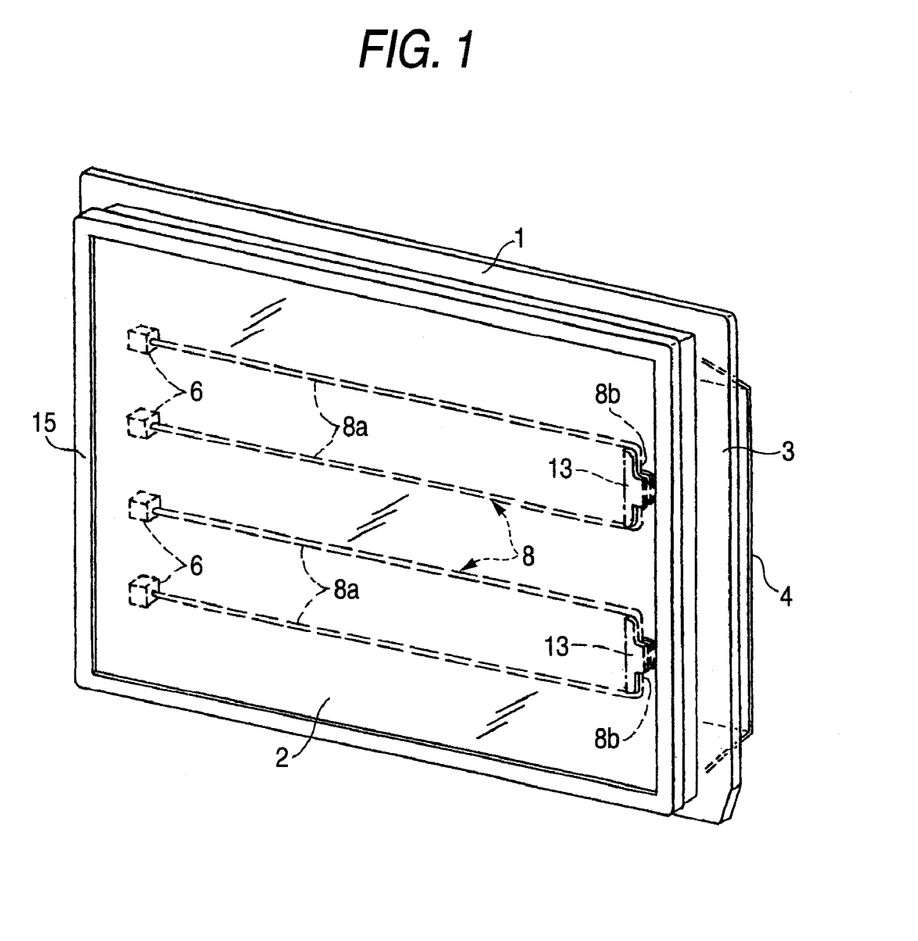
FIG. 1 is a perspective view showing a liquid crystal module of the first embodiment of the present invention.
Figure 2:
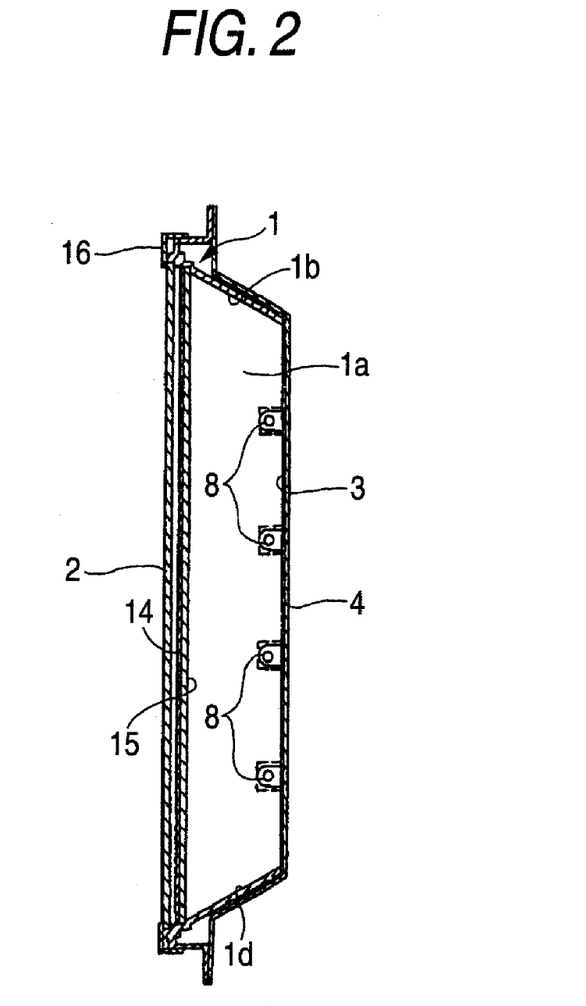
FIG. 2 is a lateral sectional view of the liquid crystal module.
Figure 3:
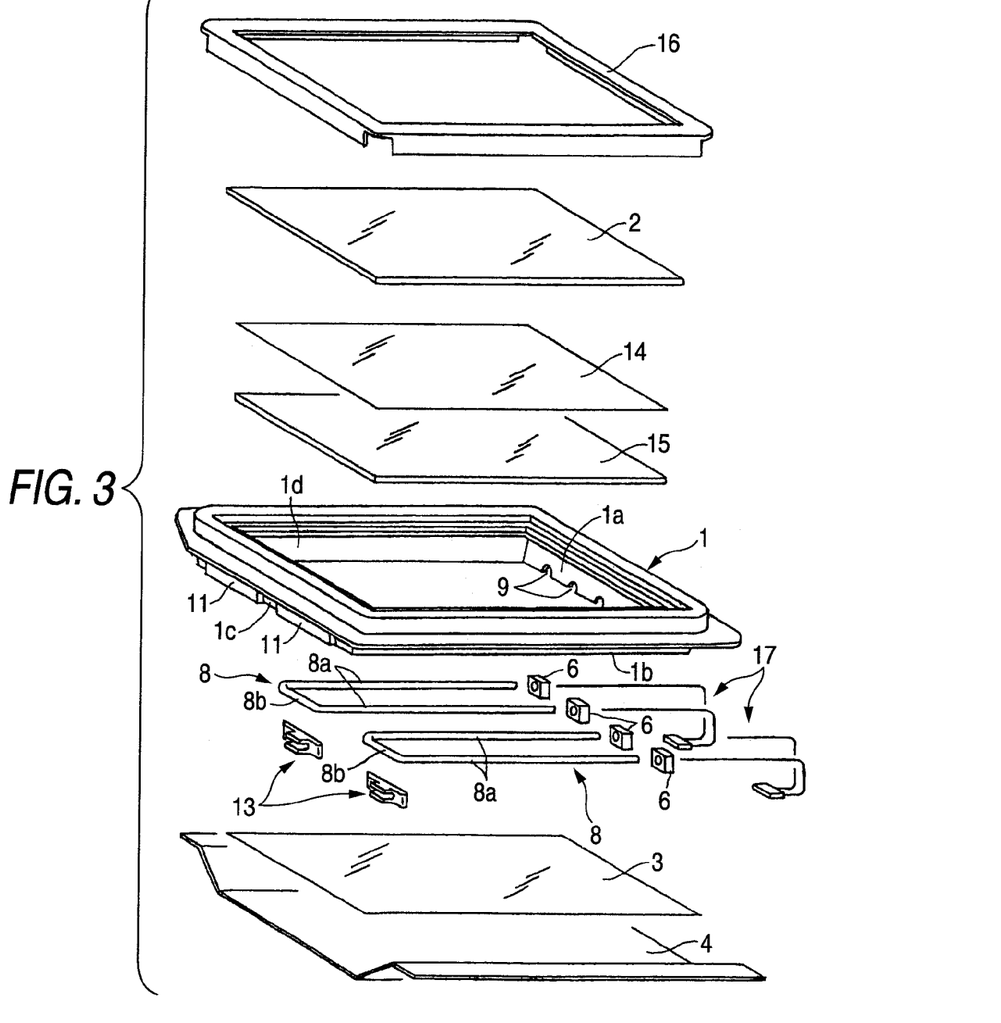
FIG. 3 is an exploded perspective view of the liquid crystal module.
Figure 4:
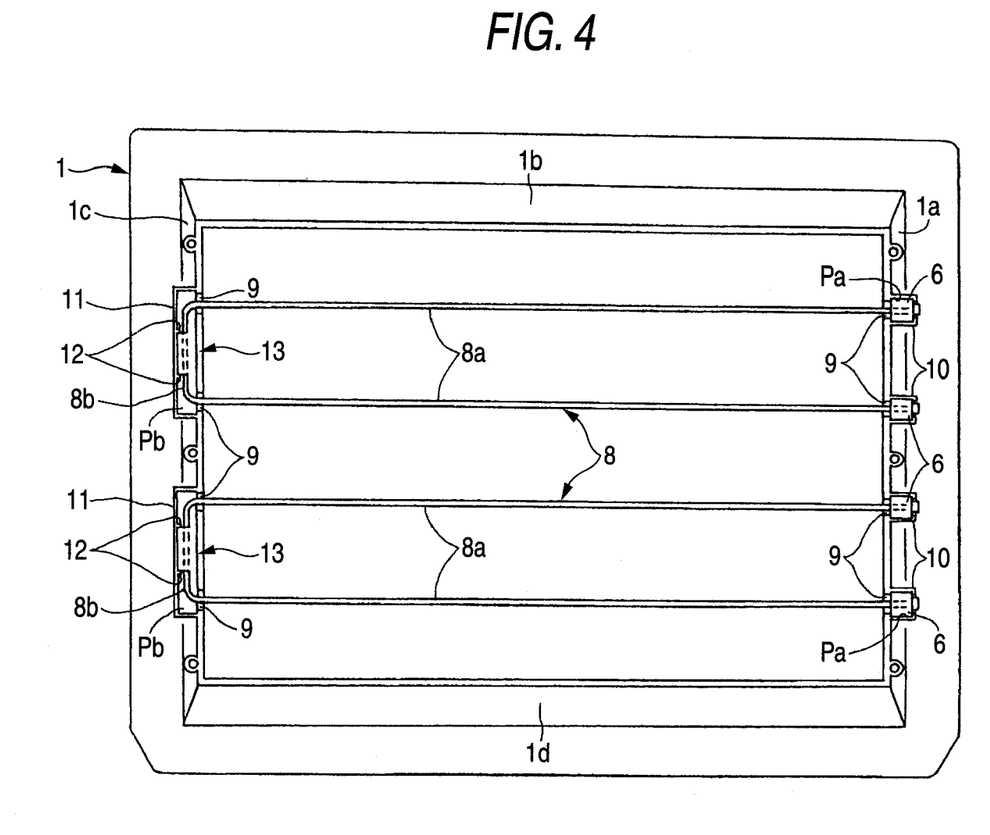
FIG. 4 is a rear side view showing a state in which a U-shaped light source is attached to a mold frame of the liquid crystal module.
Figure 5A:
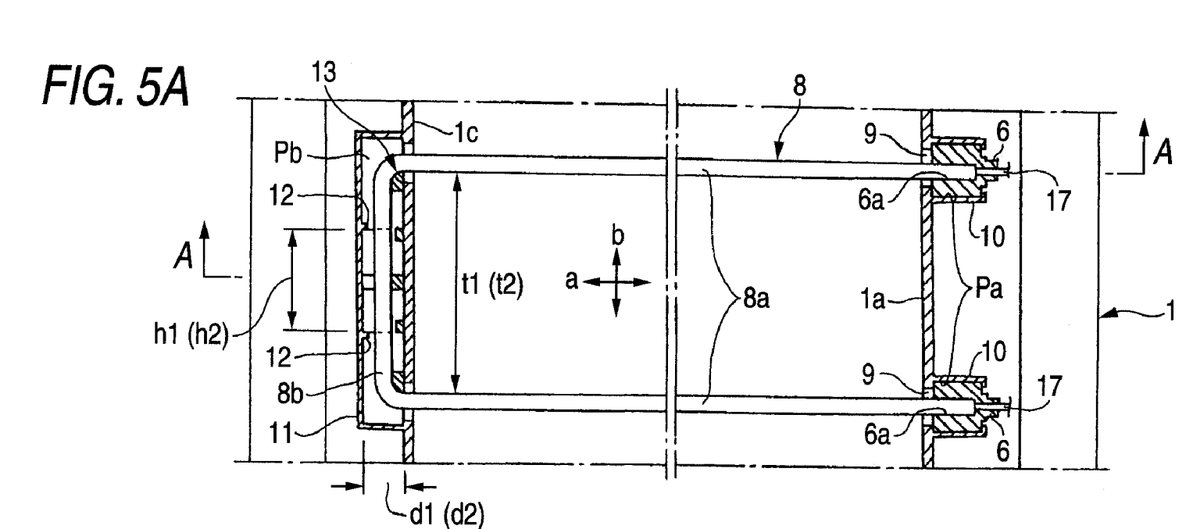
FIG. 5A is a longitudinal sectional view of the liquid crystal module.
Figure 5B:
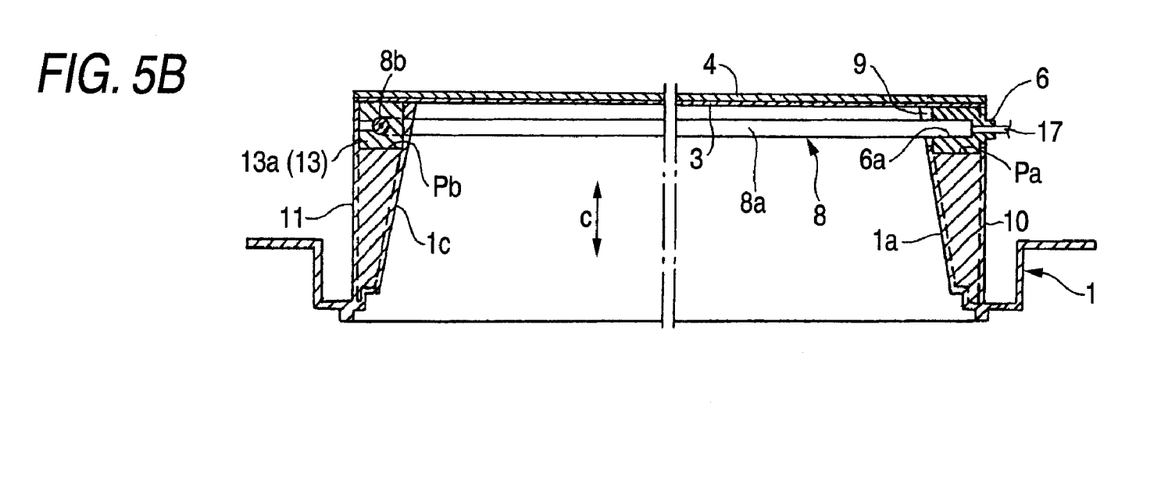
FIG. 5B is a view taken on line A-A.
Figure 6:
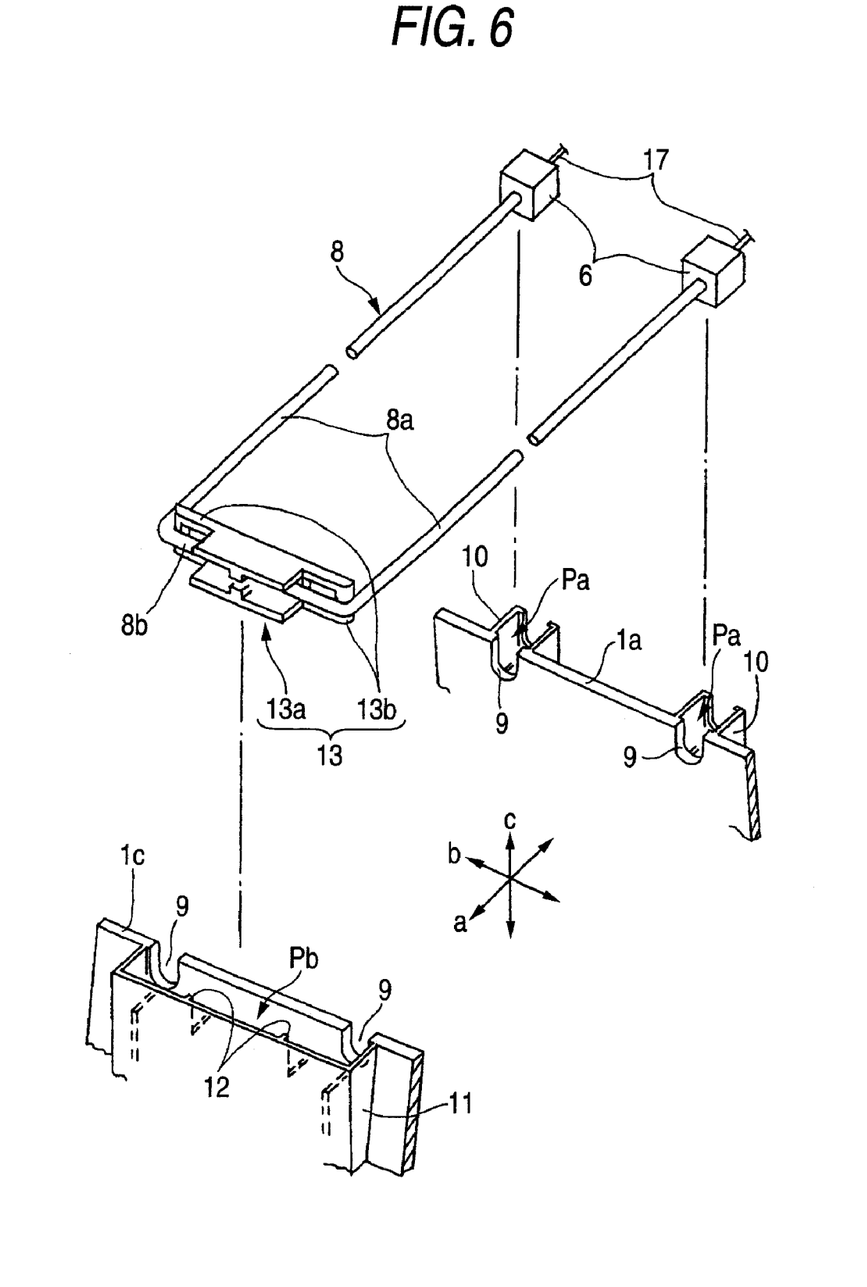
FIG. 6 is an exploded perspective view of a primary portion of the liquid crystal module.
Figure 7A:
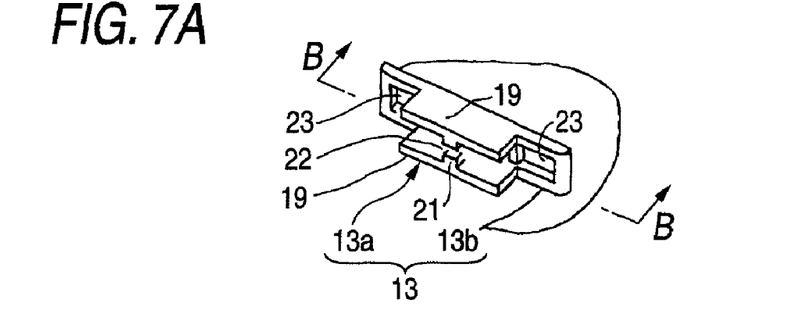
FIG. 7A is a perspective view of the lamp holder.
Figure 7B:
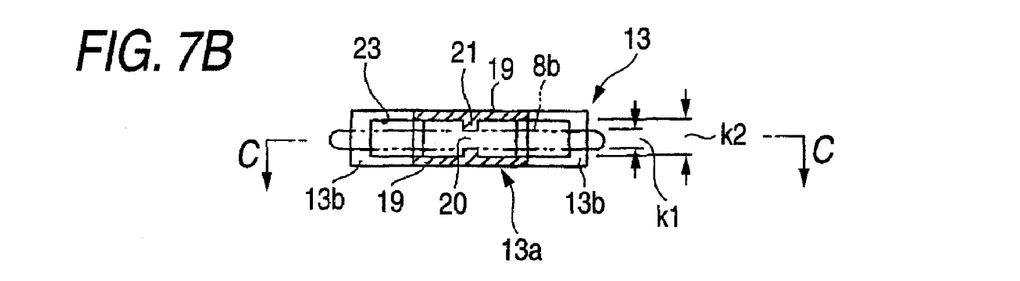
FIG. 7B is a view taken on line B-B.
Figure 7C:
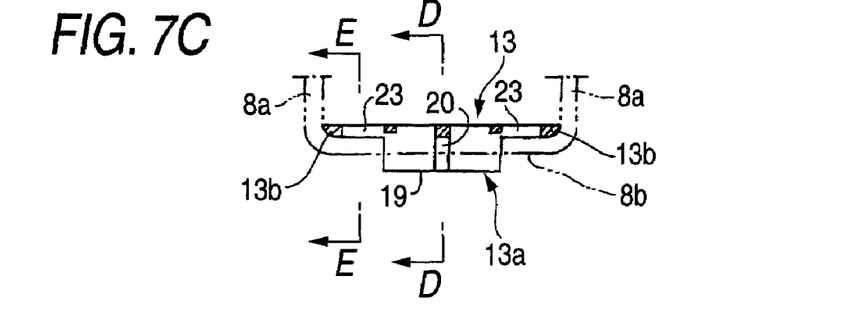
FIG. 7C is a view taken on line C-C.
Figure 7D:
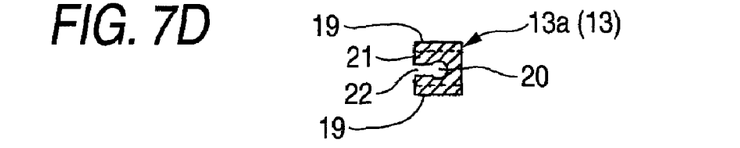
FIG. 7D is a view taken on line D-D.
Figure 7E:
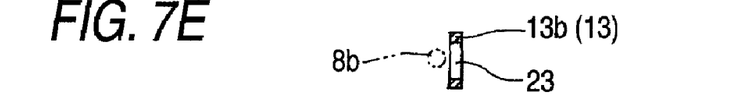
FIG. 7E is a view taken on line E-E.
Figure 8A:
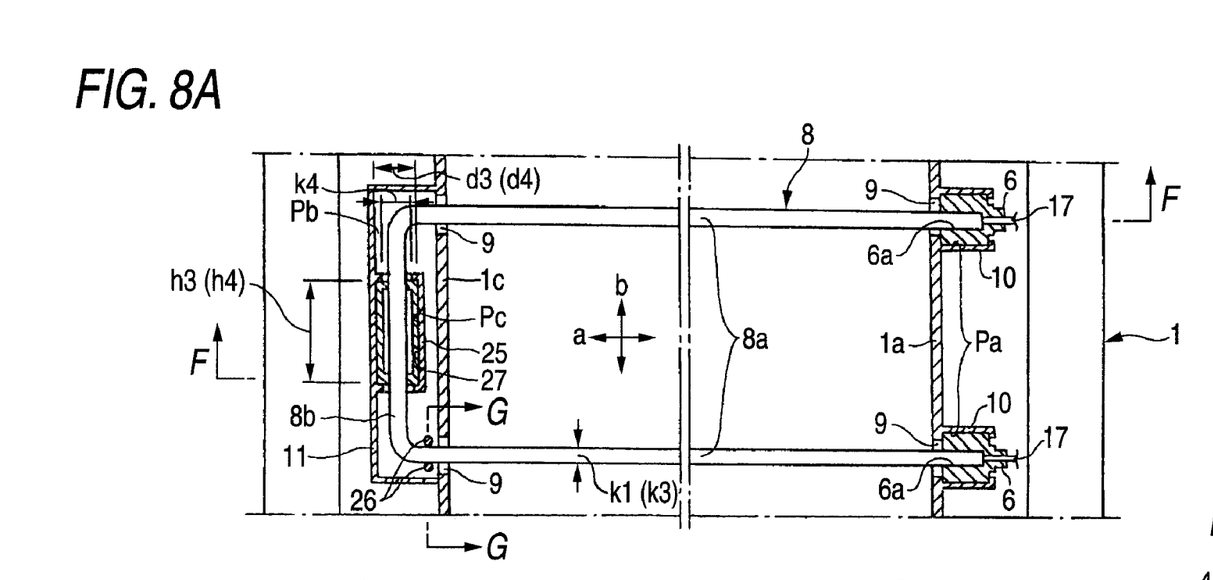
FIG. 8A is a longitudinal sectional view showing a state in which a U-shaped light source is attached to a mold frame in a liquid crystal module of the second embodiment of the present invention.
Figure 8B:
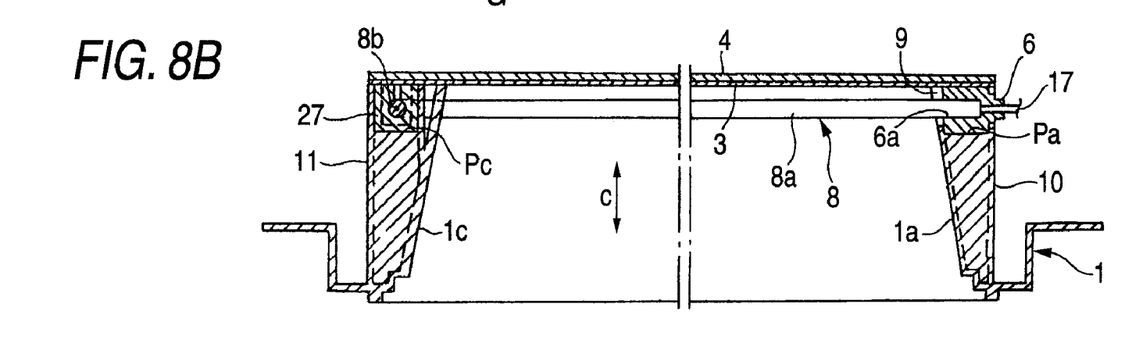
FIG. 8B is a view taken on line F-F.
Figure 8C:
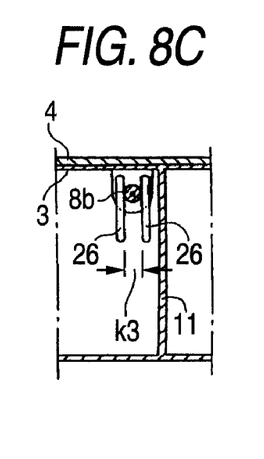
FIG. 8C is a view taken on line G-G.
Figure 9:
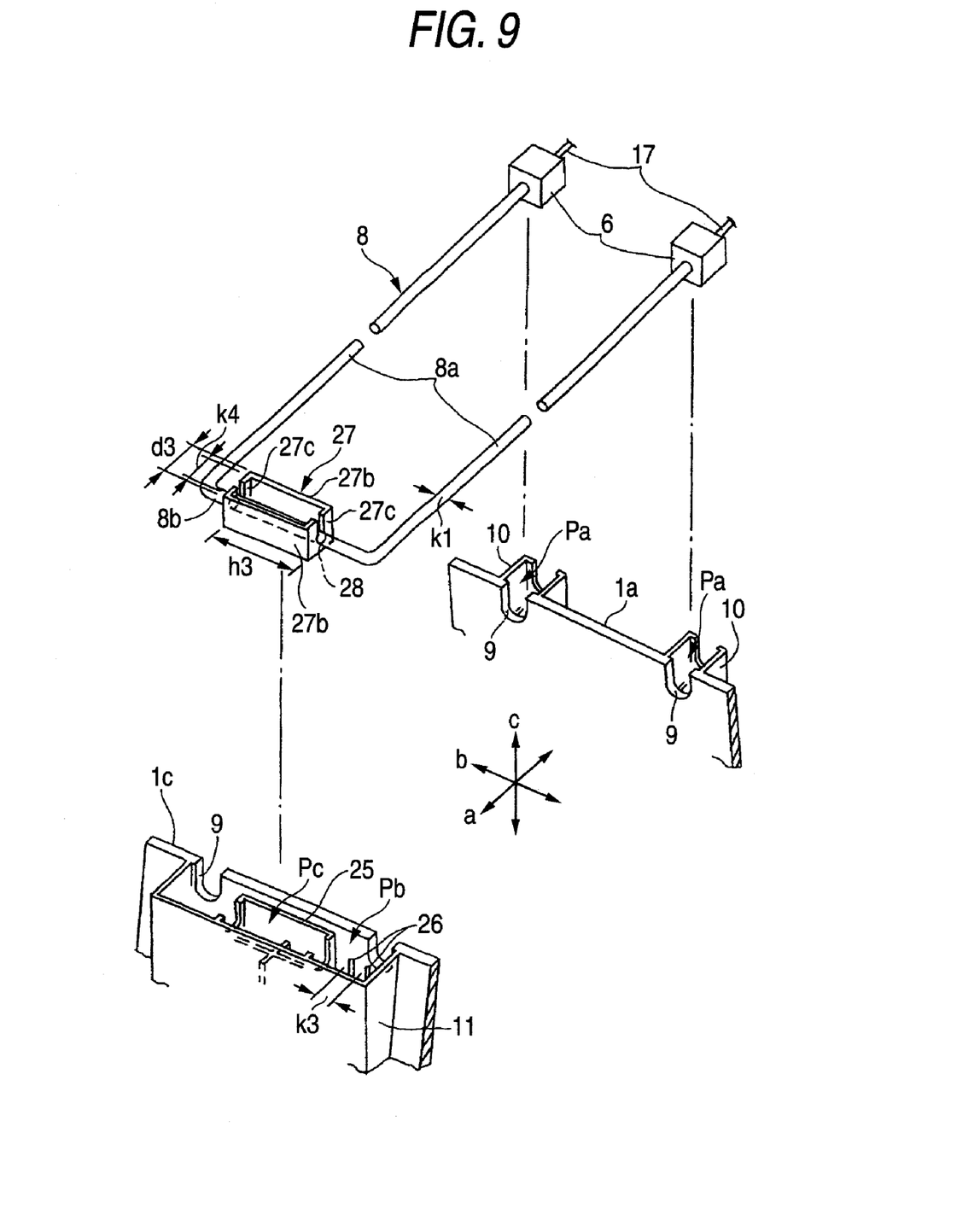
FIG. 9 is an exploded perspective view of the primary portion of the liquid crystal module.
Figure 10A:
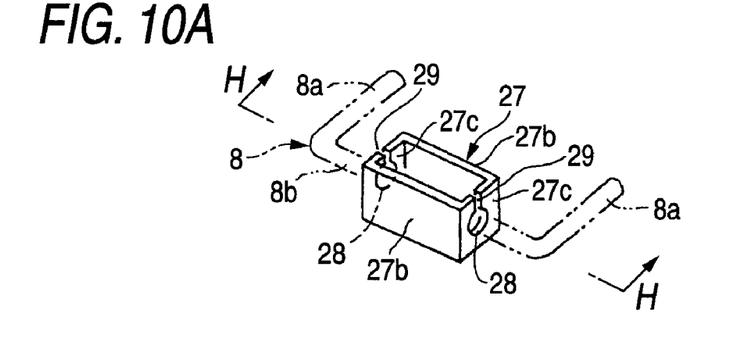
FIG. 10A is a perspective view of the lamp holder.
Figure 10B:
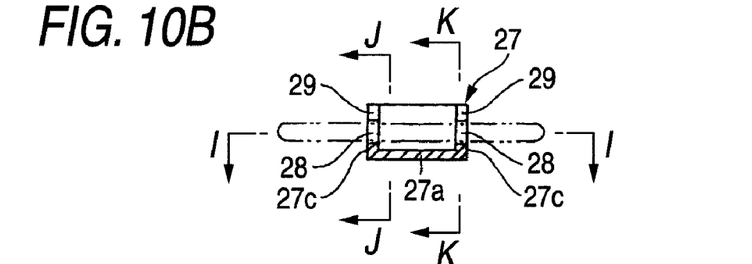
FIG. 10B is a view taken on line H-H.
Figure 10C:
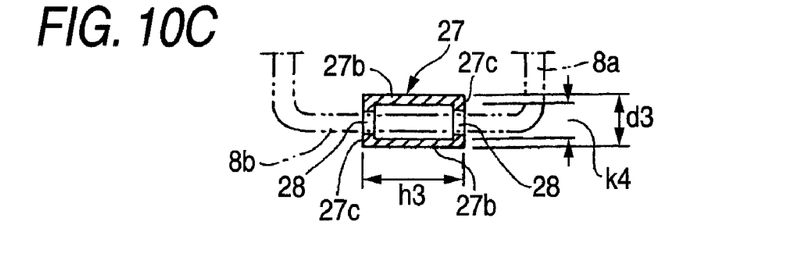
FIG. 10C is a view taken on line I-I.
Figure 10D:
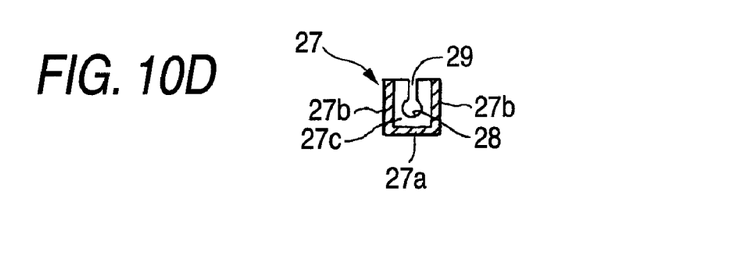
FIG. 10D is a view taken on line J-J.
Figure 10E:
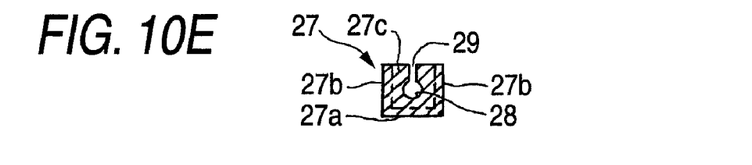
FIG. 10E is a view taken on line K-K.

As shown in FIGS. 5A, 5B and 6, the lamp socket 6 includes an elastic body made of rubber which is formed into a rectangular block shape, which is substantially the same as the small pocket Pa in the small frame body 10. The lamp socket 6 is put on the idle end portions of each lateral pipe portion 8a via the lamp hole 6a formed at the center.

As shown in FIGS. 5A to 7E, the lamp holder 13 includes: a holder body 13a made of elastic material such as rubber; and an arm portion 13b, which is formed integrally with the holder body 13a concerned, both end portions of which are extended from the holder body 13a to both sides. The lateral width d1 of the holder body 13a is set to be substantially the same as the lateral width d2 of the large pocket Pb in the large frame body 11. Further, the longitudinal width hi of the holder body 13a is set to be substantially the same as the interval h2 between both the positioning protruding pieces 12. The length t1 between both end portions of the arm portion 13b is set to be substantially the same as the interval t2 between both lateral pipe portions 8a.

The holder body 13a includes: a pair of holding pieces 19 which are arranged in parallel with each other at the interval k2 a little larger than the outer diameter k1 of the longitudinal pipe portion 8b; and an intermediate piece 21 having the lamp hole 20 for connecting the centers of both the holding pieces 19. In the intermediate piece 21 concerned, the slit 22 extending from the end face to the lamp hole 20 is formed, and the ventilation hole 23 is formed in the arm portion 13b.

The procedure of attaching the U-shaped light source 8 will be explained as follows. The lamp hole 20 is engaged with the longitudinal pipe portion 8b via the slit 22 of the lamp holder 13. When both end portions of the arm portion 13b are made to come into contact with the corner portion between both the lateral pipe portion 8a and the longitudinal pipe portion 8b, under the condition that the lamp holder 13 concerned is put on the longitudinal pipe portion 8b as shown in FIG. 6, the lamp holder 13 is inserted into the large pocket Pb. At the same time, the lamp sockets 6, which are put on the idle end portions of both the lateral pipe portion 8a, are inserted into the small pockets Pa.

According to the above structure, an impact force given in the lateral direction "a" along the longitudinal direction of the lateral pipe portion 8a is received by the longitudinal plate portions 1a, 1c of the mold frame 1, the small frame body 10 and the large frame body 11 via the lamp socket 6 and the lamp holder 13. An impact force given in the longitudinal direction "b" along the longitudinal direction of the longitudinal pipe portion 8b is received by both the positioning protruding pieces 12 and the small frame body 10 via the lamp socket 6 and the lamp holder 13. An impact force given in the before and after direction "c" perpendicular to the lateral direction "a" and the longitudinal direction "b" is received by the mold frame 1 and the support frame 4 via the lamp socket 6 and the lamp holder 13. For example, even when an impact force is given to the U-shaped light source 8 in all directions at the time of transportation, the impact force can be positively reduced by the buffer actions of the lamp socket 6 and the lamp holder 13. Therefore, the impact force does not concentrate upon the idle end portions of both the lateral pipe portions 8a and the longitudinal pipe portion 8b. In this way, the U-shaped light source 8 can be prevented from being damaged by the impact force. Accordingly, it is possible to provide a liquid crystal module, the shock resistance property of which is excellent.

Further, since the ventilation hole 23 is provided in the arm portion 13b of the lamp holder 13 and both the longitudinal pieces 19 of the lamp holder body 13a are separate from the longitudinal pipe portion 8b, the ventilation property is excellent and no heat stays in the lamp holder 13. Further, the intermediate piece 21 of the holder body 13a comes into contact with the longitudinal pipe portion 8b a little via the inner circumferential face of the lamp hole 20. Accordingly, there is no possibility that the temperature is raised and the luminance is lowered by the heat generated by the longitudinal pipe portion 8b. Therefore, the life of the U-shaped light source 8 can be extended.

FIGS. 8A to 10E are views showing a primary portion of the liquid crystal module of the second embodiment of the present invention. When the substantially C-shaped inside frame body 25 is integrally formed in each large frame body 11, the inner pocket Pc, which is a little smaller than the large pocket Pb, is formed in the inside frame body 25, and a pair of pins 26 are protruded at the positions opposed to one insertion recess portion 9 in each large frame body 11 at the interval "k3" which is the same as or a little larger than the outer diameter k1 of the lateral pipe portion 8a. The structure except for the above structure is substantially the same as that described in the first embodiment shown in FIGS. 1 to 7E. Therefore, like reference characters are used to indicate like parts, and the explanations are omitted here.

The lamp holder 27 inserted into the inner pocket Pc includes an elastic body made of rubber having a bottom piece 27a, a pair of longitudinal pieces 27b formed integrally with the outer circumferential edge of the bottom piece 27a and a pair of lateral piece 27c having a lamp hole 28. The lateral width d3 of the bottom piece 27a is set to be substantially the same as the lateral width d4 of the inner pocket Pc. The longitudinal width h3 of the bottom piece 27a is set to be substantially the same as the longitudinal width h4 of the inner pocket Pc. The interval k4 between both the longitudinal pieces 27b is set to be a little larger than the outer diameter k1 of the longitudinal pipe portion 8b. The slit 29 is formed in each lateral piece 27c. This slit 29 extends from the end face of the lateral piece 27c to the lamp hole 28.

The procedure of attaching the U-shaped light source 8 will be explained below. When the lamp hole 28 is engaged with the longitudinal pipe portion 8b via the slit 29, under the condition that the lamp holder 27 is put on the longitudinal pipe portion 8b as shown in FIG. 6, the lamp holder 27 is inserted into the inner pocket Pc, and one lateral pipe portion 8a is inserted into between both the positioning pins 26. Then, each lamp socket 6, which is put on the idle end portion of both the lateral pipe portions 8a, is inserted into each small pocket Pa.

According to the above structure, the substantially same effect as that of the first embodiment shown in FIGS. 1 to 7E can be provided. An impact force given in the lateral direction "a" along the longitudinal direction of the lateral pipe portion 8a is received by the small frame body 10, the inside frame body 25 and the mold frame 1 via the lamp socket 6 and the lamp holder 27. An impact force given in the longitudinal direction "b" along the longitudinal direction of the longitudinal pipe portion 8b is received by the lamp socket 6 and both the positioning pins 26 for holding both lateral pieces 27c of the lamp holder 27 and the lateral pipe portion 8a. An impact force given in the before and after direction "c" perpendicular to the lateral direction "a" and the longitudinal direction "b" is received by the mold frame 1 and the support frame 4 via the lamp socket 6 and the lamp holder 27. For example, even when an impact force is given to the U-shaped light source 8 in all directions at the time of transportation, the impact force can be positively reduced by the buffer actions of the lamp socket 6 and the lamp holder 27. Therefore, the impact force does not concentrate upon the idle end portions of both the lateral pipe portions 8a and the longitudinal pipe portion 8b. In this way, the U-shaped light source 8 can be prevented from being damaged by the impact force. Accordingly, it is possible to provide a liquid crystal module, the shock resistance property of which is excellent.

Further, both the longitudinal pieces 27b are separate from the longitudinal pipe portion 8b. Therefore, the ventilation property is so excellent that heat can not stay in the lamp holder 27. Further, only the holder body comes into contact with the longitudinal pipe portion 8b a little via the lamp holes 28 formed in both the lateral pieces 27c. Accordingly, there is no possibility that the temperature is raised and the luminance is lowered by the heat generated by the longitudinal pipe portion 8b. Therefore, the life of the U-shaped light source 8 can be extended.

What is claimed is:

1. A liquid crystal module comprising:
a mold frame, having a rectangular shape, including a pair of longitudinal plate portions and a which is pair of lateral plate portions;
a liquid crystal cell arranged on a front face of the mold frame;
a support frame fixed to a rear face of the mold frame via a reflection sheet; and
a plurality of U-shaped light sources wherein each U-shaped light source includes long lateral pipe portions which are parallel with each other and a short longitudinal pipe portion for connecting both lateral pipe portions;
wherein an insertion recess portion for inserting both end portions of each lateral pipe portion is formed at a rear end edge of each longitudinal plate portion;
a plurality of substantially C-shaped small frame bodies are integrally protruded from an outer circumferential face of one longitudinal plate portion so that the small frame bodies can surround the insertion recess portions;
a plurality of rectangular substantially C-shaped large frame bodies are integrally protruded on an outer circumferential face of the other longitudinal plate portion so that the large frame bodies can surround two adjoining insertion recess portions;
a pair of protrusions used for positioning are protruded at a predetermined interval from the center on the inside of each of the large frame bodies;
two lamp sockets and one lamp holder are used for each U-shaped light source;
each lamp socket includes a rectangular block-shaped elastic socket body, the shape of which is substantially the same as that of a small pocket formed in each of the small frame bodies;
each lamp socket covers an idle end of each lateral pipe portion via a lamp hole formed in the elastic socket body;
the lamp holder includes a holder body including an elastic body, a lateral width of which is substantially the same as that of a large pocket formed in each of the large frame bodies and a longitudinal width of which is substantially the same as that of the interval between the positioning protrusions;
the lamp holder also includes an arm portion formed integrally with the holder body;
both end portions of the arm portion being extended from the holder body to both sides so that a length can be substantially the same as the interval between both lateral pipe portions;
the holder body includes a pair of holding pieces arranged in parallel with each other at an interval a little larger than an outer diameter of the longitudinal pipe portion and also includes an intermediate piece having a lamp hole for connecting the centers of both holding pieces;
a slit is formed in the intermediate piece from an end face to the lamp hole;
a ventilation hole is formed in the arm portion;
the lamp holder, which is put on the longitudinal pipe portion, is inserted into the large pocket when the lamp hole is engaged with the longitudinal pipe portion via the slit and both end portions of the arm portion are contacted with the corner portion between both lateral pipe portions and longitudinal pipe portions; and
the U-shaped light source is arranged at a predetermined position in the mold frame when each lamp socket is inserted into each small pocket.

2. A liquid crystal module comprising:
a mold frame, having a rectangular shape, including a pair of longitudinal plate portions and a pair of lateral plate portions;
a liquid crystal cell arranged on a front face of the mold frame;
a support frame fixed to a rear face of the mold frame via a reflection sheet; and
a plurality of U-shaped light sources wherein each U-shaped light source includes long lateral pipe portions which are parallel with each other and a short longitudinal pipe portion for connecting both lateral pipe portions;
wherein an insertion recess portion for inserting both end portions of each lateral pipe portion is formed at a rear end edge of each longitudinal plate portion;
a plurality of substantially C-shaped small frame bodies are integrally protruded from an outer circumferential face of one longitudinal plate portion so that the small frame bodies can surround the insertion recess portions;
a plurality of rectangular substantially C-shaped large frame bodies are integrally protruded on an outer circumferential face of the other longitudinal plate portion so that the large frame bodies can surround two adjoining insertion recess portions;
two lamp sockets and one lamp holder are used for each U-shaped light source;
each lamp socket includes a rectangular block-shaped elastic socket body, the shape of which is substantially the same as that of a small pocket formed in each of the small frame bodies;
each lamp socket covers an idle end of each lateral pipe portion via a lamp hole formed in the elastic socket body;
an inner pocket, which is a little smaller than a large pocket formed in each of the large frame bodies, is formed in a substantially C-shaped inner frame body when the inner frame body is integrally formed in each of the large frame bodies;
a pair of positioning pins are protruded at positions opposed to one insertion recess portion in each of the large frame bodies at an interval which is the same as the outer diameter of the lateral pipe portion or a little larger than the outer diameter of the lateral pipe portion;
the lamp holder includes a rectangular box-shaped elastic body having a bottom piece, a lateral width and a longitudinal width of which are substantially the same as those of the inner pocket, also having a pair of longitudinal pieces formed integrally with the outer circumferential edge of the bottom piece and also having a pair of lateral pieces having a lamp hole;
an interval between both the longitudinal pieces is set to be larger than the outer diameter of the longitudinal pipe portion;
a slit is formed in each lateral piece from an end face to the lamp hole, the lamp holder, which is put on the longitudinal pipe portion, is inserted into the inner pocket when the lamp hole is engaged with the longitudinal pipe portion via the slit; and the U-shaped light source is arranged at a predetermined position of the mold frame when one lateral pipe portion is inserted between both positioning pins and each lamp socket is inserted into each small pocket.

3. A liquid crystal module comprising:

a mold frame, having a rectangular shape, including a pair of longitudinal plate portions and a pair of lateral plate portions;

a liquid crystal cell arranged on a front face of the mold frame;

a support frame fixed to a rear face of the mold frame via a reflection sheet; and a plurality of U-shaped light sources wherein each U-shaped light source having long lateral pipe portions, which are arranged in parallel with each other, and also having a short longitudinal pipe portion for connecting both lateral pipe portions;

wherein an insertion recess portion for inserting both ends of each lateral pipe is formed at a rear end edge of each lateral plate portion;

a plurality of substantially C-shaped small frame bodies are integrally protruded from an outer circumferential face of one longitudinal plate portion so that the substantially C-shaped small frame bodies can surround the insertion recess portions;

a plurality of substantially C-shaped large frame bodies are integrally protruded on an outer circumferential face of the other longitudinal plate portion so that the substantially C-shaped large frame bodies can surround two adjoining insertion recess portions; and each U-shaped light source is arranged at a predetermined position of the mold frame when a lamp holder including an elastic body engaged with the longitudinal pipe portion is inserted into a large pocket in the large frame body and when a lamp socket including an elastic body, which covers an idle end of both lateral pipe portions, is inserted into a small pocket in each small frame body.

4. A liquid crystal module according to claim 3, wherein the lamp holder includes a holder body, the lateral width of which is substantially the same as that of the large pocket and the longitudinal width of which is substantially the same as the interval between a pair of positioning protrusions integrally protruding from the center on the inside of each large frame body;

the lamp holder also includes an arm portion integrally formed in the holder body;

both end portions of the arm portion being extended from the holder body to both sides so that the length can be set to be substantially the same as the interval between both lateral pipe portions;

the holder body includes a pair of holding pieces which are arranged in parallel with each other at an interval a little larger than the outer diameter of the longitudinal pipe portion;

the holder body also includes an intermediate piece having a lamp hole for connecting the centers of both holding pieces;

a slit extending from the end face to the lamp hole is formed in the intermediate piece;

a ventilation hole is formed in the arm portion; and the lamp holder, which covers the longitudinal pipe portion, is inserted into the large pocket when the lamp hole is engaged with the longitudinal pipe portion via the slit and when both end portions of the arm portion are contacted with the corner portion between both lateral pipe portions and the longitudinal pipe portion.

5. A liquid crystal module according to claim 3, wherein an inner pocket, smaller than the large pocket is formed in a substantially C-shaped inner frame body when the inner frame body is integrally formed in each of the large frame bodies;

a pair of positioning pins are protruded at positions opposed to one insertion recess portion in each of the large frame bodies at an interval which is the same as the outer diameter of the lateral pipe portion or a little larger than the outer diameter of the lateral pipe portion;

the lamp holder includes a rectangular box-shaped elastic body having a bottom piece, the Lateral width and the longitudinal width of which are substantially the same as those of the inner pocket also having a pair of longitudinal pipes formed integrally with the outer circumferential edge of the bottom piece and also having a pair of lateral pieces having a lamp hole;

an interval between both the longitudinal pieces is set to be larger than the outer diameter of the longitudinal pipe portion; and a slit is formed in each lateral piece from the end face to the lamp hole, the lamp holder, which is put on the longitudinal pipe portion, is inserted into the inner pocket when the lamp hole is engaged with the longitudinal pipe portion via the slit, so that one lateral pipe portion can be inserted into between both positioning pins.

* * * * *